US012157132B2

(12) United States Patent
Roßbach et al.

(10) Patent No.: US 12,157,132 B2
(45) Date of Patent: Dec. 3, 2024

(54) SPRAY HEAD FOR COOLING LUBRICATION OF A DIE OF A FORMING MACHINE

(71) Applicant: SMS group GmbH, Düsseldorf (DE)

(72) Inventors: Axel Roßbach, Korschenbroich (DE); Erdem Karakas, Mönchengladbach (DE); Andreas Brenner, Dortmund (DE)

(73) Assignee: SMS group GmbH, Düsseldorf (DE)

( * ) Notice: Subject to any disclaimer, the term of this patent is extended or adjusted under 35 U.S.C. 154(b) by 0 days.

(21) Appl. No.: 17/611,714

(22) PCT Filed: May 15, 2020

(86) PCT No.: PCT/EP2020/063698

§ 371 (c)(1),
(2) Date: Nov. 16, 2021

(87) PCT Pub. No.: WO2020/229682

PCT Pub. Date: Nov. 19, 2020

(65) Prior Publication Data

US 2024/0024905 A1 Jan. 25, 2024

(30) Foreign Application Priority Data

May 16, 2019 (DE) ..................... 10 2019 207 163.5

(51) Int. Cl.
*B05B 12/12* (2006.01)
*B21D 37/18* (2006.01)
(Continued)

(52) U.S. Cl.
CPC .............. *B05B 12/12* (2013.01); *B21D 37/18* (2013.01); *B21J 3/00* (2013.01); *B30B 15/0088* (2013.01); *B30B 15/34* (2013.01)

(58) Field of Classification Search
CPC ........... B21J 1/06; B21J 3/00; B30B 15/0088; B30B 15/34; B21D 37/18; B05B 12/12; G06V 10/752
See application file for complete search history.

(56) References Cited

U.S. PATENT DOCUMENTS 5,289,766 A 3/1994 Conrad et al.
5,785,252 A * 7/1998 Keim .................... B05B 7/0884 239/422

(Continued)

FOREIGN PATENT DOCUMENTS

DE 4202917 C1 8/1993
DE 19648708 A1 6/1998

(Continued)

OTHER PUBLICATIONS

CN 206083715U, Wang et al. Apr. 2017.*

(Continued)

*Primary Examiner* — Edward T Tolan
(74) *Attorney, Agent, or Firm* — Smartpat PLC

(57) ABSTRACT

A spray head for the cooling lubrication of a lower die and/or an upper die of a forming machine is disclosed. The spray head is able to be introduced between two working strokes into a working chamber between the lower die and the upper die. The spray head has at least two individually controllable nozzles for the cooling lubrication of different places of a die surface of the lower die and/or the upper die. The spray head also has a thermal imaging camera for recording a thermal image of the lower die and/or the upper die. A forming machine has a cooling device comprising an aforementioned spray head.

10 Claims, 1 Drawing Sheet

(51) Int. Cl.

| | |
|---|---|
| ***B21J 3/00*** | (2006.01) |
| ***B30B 15/00*** | (2006.01) |
| ***B30B 15/34*** | (2006.01) |

(56) References Cited

U.S. PATENT DOCUMENTS

| | | | | |
|---|---|---|---|---|
| 6,192,968 | B1 * | 2/2001 | Renkl | B05B 3/1057 164/121 |
| 8,452,214 | B2 * | 5/2013 | Hobo | G03G 15/104 399/57 |
| 10,343,211 | B2 * | 7/2019 | Kress | B22D 17/2015 |
| 10,960,420 | B2 * | 3/2021 | Rossbach | B05B 7/1254 |
| 2003/0155450 | A1 | 8/2003 | Renkl et al. | |
| 2018/0056382 | A1 | 3/2018 | Kress et al. | |
| 2018/0200740 | A1 | 7/2018 | Roßbach et al. | |
| 2020/0078850 | A1 | 3/2020 | Roßbach et al. | |

FOREIGN PATENT DOCUMENTS

| | | | |
|---|---|---|---|
| DE | 69837835 | | 10/2007 |
| DE | 102010011762 | A1 | 9/2011 |
| DE | 102010014952 | A1 | 10/2011 |
| DE | 102015114202 | A1 | 1/2017 |
| DE | 102017100438 | A1 | 7/2018 |
| DE | 102018220412 | A1 | 6/2019 |
| JP | H081302 | A | 1/1996 |
| JP | H11262842 | A | 9/1999 |
| JP | 2006250714 | A | 9/2006 |
| JP | 2007222890 | A | 9/2007 |
| JP | 2007268614 | A | 10/2007 |
| JP | 2013212526 | A | 10/2013 |
| JP | 2015150617 | A | 8/2015 |
| JP | 2017060974 | A | 3/2017 |

OTHER PUBLICATIONS

KR 20110107929A, Kim Oct. 2011.*

JP 58-167047A, Iwasaki et al. Oct. 1983.*

KR 20120020445A, Park et al. Mar. 2012.*

JP 2017-87276, Chiba May 2017.*

Koos van Putten, “Digital testen statt teuer versuchen”, SMS group GmbH, Mönchengladbach, Oct. 2018 (with English Language Abstract).

Zahra Mohammadifard M. Sc., et al., “Überwachung der Sprühkühlwirkung mittels parallelen Einsatzes von Hochgeschwindigkeits- und Thermografiekamera”, SchmiedeJournal Mar. 2015 (with English Language Abstract).

* cited by examiner

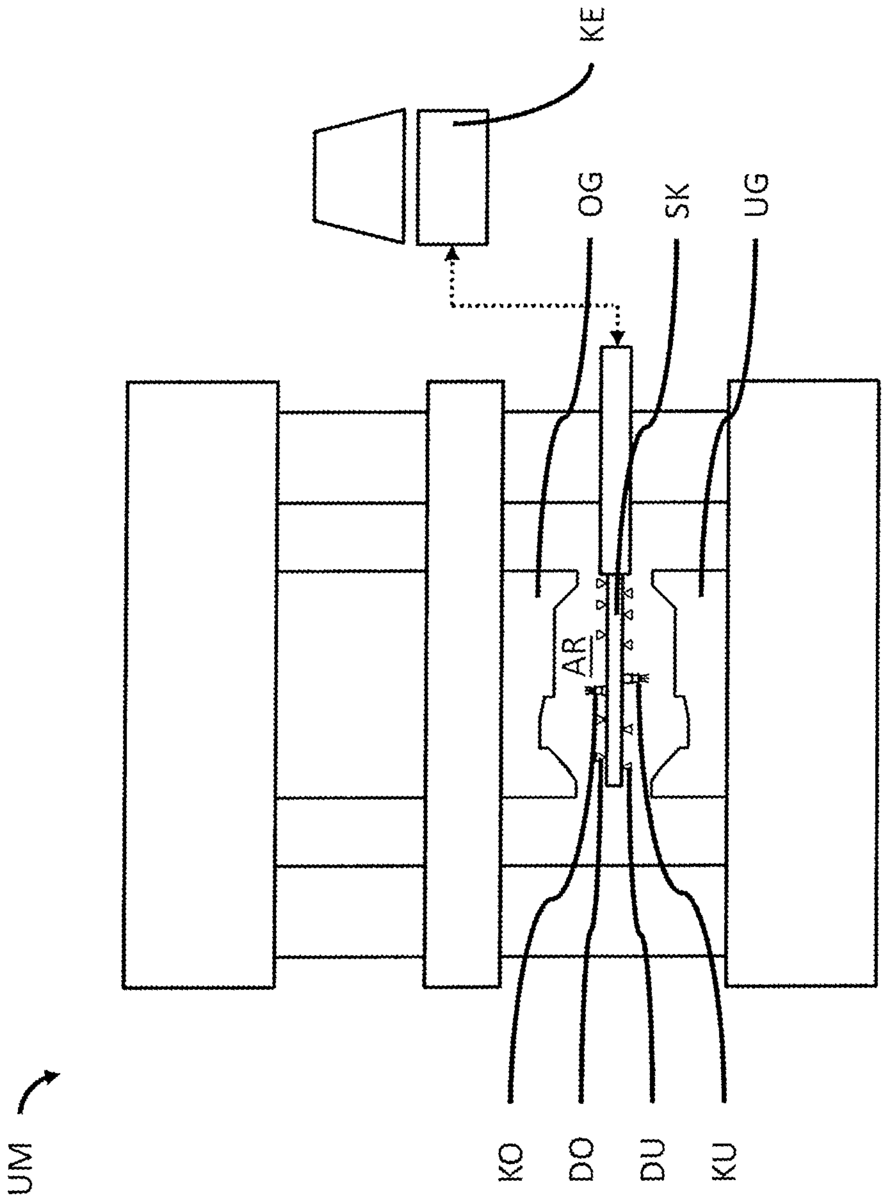
KE
OG
SK
UG
AR
KO
DO
DU
KU
UM

SPRAY HEAD FOR COOLING LUBRICATION OF A DIE OF A FORMING MACHINE

TECHNICAL FIELD

The present disclosure relates to a spray head for the cooling lubrication of a lower die and/or an upper die of a forming machine, a cooling device comprising such a spray head, a forming machine comprising such a cooling device and a forming method.

BACKGROUND

DE 10 2015 114 202 A1 discloses a spray head for the cooling lubrication of at least one die of a forming machine in the form of a closed-die forging press having a lower die and an upper die, which spray head is introduced between two working strokes into a working chamber between the lower die and the upper die and carries at least one two-substance nozzle, which, for cooling lubrication, atomizes a mixture of spraying agent and spraying air onto the die and is connected to at least one supply channel, via which a control fluid, the mixture, spraying agent or spraying air can be supplied to the two-substance nozzle and that extends as far as a spray head foot, which carries a supply connection that is connected to the supply channel. The at least one dual-substance nozzle of the known spray head has a nozzle body formed as a single piece DE 196 48 708 A1 describes a device for the cooling lubrication of at least one die of a forming machine, which consists of a plurality of individual molds in the form of engravings or molds, as the case may be. When the individual molds are free of workpieces, spray nozzles may be inserted into the individual molds. A plurality of spray nozzles are provided for each individual die of the known forming machine, which are part of a coolant supply system. In the coolant supply system, a control valve is assigned to each spray nozzle and the control valves are connected to a computer setting device via a control line. Furthermore, a thermal imaging camera is arranged laterally outside the region in which the individual molds are moved towards each other. The thermal imaging camera records an actual value thermal image of the side or surface, as the case may be, of the mold that it can see, which includes every place on this side or surface, as the case may be, of the mold. In the device, selected places are evaluated as measuring points, to which the spray nozzles are assigned. The spray nozzles are used to cool the individual molds directly or indirectly at the measuring points. When the individual molds have been cooled, the coolant supply system is moved away from the working area of the individual molds and another working stroke of the forming machine takes place, upon which warm workpieces are inserted into the mold and formed in the mold.

It has been shown that with the known device for cooling lubrication often only an indirect cooling of the individual molds at the thermally most stressed places is possible.

SUMMARY

The present disclosure is based on the object of specifying a device and a method with which a more targeted cooling of the most thermally stressed places of the molds is made possible.

The object is achieved by the subject matter as claimed.

A spray head for the cooling lubrication of a lower die and/or an upper die of a forming machine is proposed. The spray head is able to be introduced between two working strokes into a working chamber between the lower die and the upper die and has at least two individually (i.e, separately) controllable nozzles for the cooling lubrication of different places of a die surface of the lower die and/or the upper die. The spray head can also have a significantly higher number of individually controllable nozzles. The larger the number of nozzles, the smaller the surface area of the lower die or upper die, as the case may be, cooled by each nozzle. This can allow different places of the respective die to be cooled differently. The proposed spray head is characterized in that it has a thermal imaging camera for recording a thermal image of the lower die and/or the upper die. The arrangement of the thermal imaging camera on the spray head facilitates the recording of the thermal image of the lower die and/or the upper die compared to a lateral arrangement of the thermal imaging camera next to the forming machine. Further, this arrangement can allow the thermal image to be recorded during the introduction of the spray head. Thus, waiting time for recording the thermal image before introducing the spray head can be avoided. It is also conceivable to continuously record thermal images of the die during the introduction of the spray head. In this manner, a change in local surface temperatures of the die over time can also be detected, if applicable.

In a first embodiment of the spray head, the individually controllable nozzles are formed as a one-piece assembly. In particular, the individually controllable nozzles and supply channels, via which a cooling fluid or a cooling fluid mixture can be supplied to the nozzles, can be formed as a one-piece assembly. Leaks at joints can be avoided in this manner.

Furthermore, the individually controllable nozzles, supply channels via which a cooling fluid or a cooling fluid mixture can be supplied to the nozzles, and a receptacle for the thermal imaging camera can be formed as a one-piece assembly. This means that the position of the thermal imaging camera in relation to the nozzles for cooling lubrication can already be fixed during the manufacture of the spray head.

In particular, the proposed one-piece assembly can be manufactured by means of 3D printing. The use of 3D printing to manufacture the assembly can result in a lighter spray head that is easier and faster to bring in and out of the working chamber due to its lower mass. In addition, 3D printing simplifies the adjustment of the spray head to changing geometries of the lower and/or upper die.

Furthermore, a cooling device is proposed that, in addition to a spray head described above, has a control unit for determining individual spraying times of the individually controllable nozzles as a function of the thermal image. In particular, the spraying times can be selected such that the surface temperature is as uniform as possible after the spraying process. For example, very hot places of the lower and/or upper joint can be cooled more than other regions. A surface temperature that is as uniform as possible can have a favorable effect on the service lives of the lower and upper dies. Likewise, due to the more demand-oriented, individual spraying times, the total spray consumption can be reduced.

The control unit of the cooling device can further comprise a memory for storing the thermal image. This can allow that continuous monitoring of the forming method over a plurality of cycle times, such that defects can be detected before the lower and/or upper die is no longer usable. It is also conceivable to improve the die geometry based on the continuously collected thermal images.

A forming machine with a cooling device described above with a lower die and with an upper die can enable shorter cycle times compared to conventional forming machines. In addition, due to a better assessment of the wear process, the lower and/or upper die can be used for a longer period of time, and downtimes of the forming machine can be reduced.

A forming method is further proposed, with which a workpiece is cyclically pressed between the lower die and the upper die, the workpiece is ejected from the forming machine, a spray head with at least two individually controllable nozzles for the cooling lubrication of different places of a die surface of the lower die and/or of the upper die and with a thermal image camera for recording a thermal image of the lower die and/or of the upper die is introduced into the working chamber between the lower die and the upper die, a thermal image of the lower die and/or the upper die is recorded, individual spraying times of the individually controllable nozzles are determined based on the thermal image, places of the die surface of the lower die and/or the upper die are cool-lubricated with the spray nozzles for the individually determined spraying times, and a next workpiece is loaded into the forming machine.

The individual spray times can be determined, in particular based on maximum values of the thermal image, in such a manner that a uniform surface temperature of the lower die and/or upper die is obtained after cooling lubrication.

With regard to the advantages associated with the method, reference is made to the embodiment concerning the spray head, the cooling device and the forming machine.

The invention is explained in more detail below with reference to exemplary embodiments.

BRIEF DESCRIPTION OF THE DRAWINGS

FIG. 1 shows a forming machine with a spray head.

DETAILED DESCRIPTION

FIG. 1 shows a forming machine with a lower die UG and an upper die OG, between which a workpiece can be pressed. A spray head SK is inserted into the open working chamber AR of the forming machine UM. The spray head has a plurality of nozzles DU for the cooling lubrication of the surface of the lower die UG and a plurality of nozzles DO for cooling the upper die OG. The nozzles UG and OG can each be controlled individually.

In the exemplary embodiment shown, the spray head SK further has two thermal imaging cameras KU and KO, with which thermal images of the surface of the lower die UG and the upper die OG, as the case may be, can be recorded.

In the spray head shown in FIG. 1, the individually controllable nozzles DU and DO, supply channels (not shown), via which a cooling fluid or a cooling fluid mixture can be supplied to the nozzles, and the receptacles for the thermal imaging cameras (KU, KO) are formed as a one-piece assembly. Thereby, the one-piece assembly was manufactured using a 3D printing process.

The cooling device has a control unit KE, with which individual spraying times for the individually controllable nozzles DU and DO can be determined based on the spraying times determined by means of the thermal imaging camera KU and the thermal imaging camera KO. In this manner, particularly hot places of the lower die and/or the upper die can be cooled for longer than places subject to less thermal stress, thus extending the service life of the dies.

The control unit can also have a memory in which the thermal images and/or the calculated spray times can be stored over a plurality of working cycles of the forming machine. This can make it possible to detect deviations at an early stage and reduce downtimes of the forming machine.

The invention claimed is:

1. A cooling device, comprising:

a spray head (SK) for cooling lubrication of a lower die (UG) and/or an upper die (OG) of a forming machine (UM), wherein the spray head (SK) is adapted to be introduced between two working strokes into a working chamber (AR) between the lower die (UG) and the upper die (OG), wherein the spray head (SK) comprises at least two separately controllable nozzles (DU, DO) for the cooling lubrication of different places of a die surface of the lower die (UG) and/or the upper die (OG), and wherein the spray head (SK) comprises a thermal imaging camera (KU, KO) for recording a thermal image of the lower die (UG) and/or the upper die (OG); and a control unit (KE) for determining individual spraying times of the separately controllable nozzles as a function of the thermal image, wherein the control unit (KE) comprises a memory for storing thermal images over a plurality of cycles of the forming machine (UM), wherein the control unit (KE) is configured to store thermal images captured during different ones of the plurality of cycles of the forming machine (UM), and wherein the control unit (KE) is configured to continuous monitor operation of the forming machine (UM) over the plurality of cycles based on the stored thermal images and to detect defects before the lower die (UG) and/or an upper die (OG) is no longer usable.

2. The cooling device according to patent claim 1, wherein the separately controllable nozzles (DU, DO) are formed as a one-piece assembly.

3. The cooling device according to patent claim 1, wherein the separately controllable nozzles (DU, DO) and supply channels, via which a cooling fluid or a cooling fluid mixture can be supplied to the nozzles (DU, DO), are formed as a one-piece assembly.

4. The cooling device according to patent claim 1, wherein the separately controllable nozzles (DU, DO), supply channels via which a cooling fluid or a cooling fluid mixture can be supplied to the nozzles, and a receptacle for the thermal imaging camera (KU, KO) are formed as a one-piece assembly.

5. The cooling device according to claim 2, wherein the one-piece assembly is manufactured by 3D printing.

6. A forming machine (UM), comprising:

the cooling device according to claim 1;

the lower die (UG); and the upper die (OG).

7. The cooling device according to patent claim 1, wherein the at least two separately controllable nozzles (DU, DO) include a plurality of separately controllable upwardly directed nozzles (DO) for cooling lubrication of different areas of the die surface of the upper die (OG), and a plurality of separately controllable downwardly directed nozzles (DU) for cooling lubrication of different areas of the die surface of the lower die (UG).

8. A forming method, comprising:

cyclically pressing a workpiece between a lower die (UG) and an upper die (OG) of a forming machine (UM);

ejecting the workpiece from the forming machine (UM);

introducing a spray head (SK) with at least two separately controllable nozzles (DU, DO) for cooling lubrication of different places of a die surface of the lower die (UG) and/or of the upper die (OG) and with a thermal imaging camera (KU, KO) for recording a thermal image of the lower die (UG) and/or of the upper die (OG) into a working chamber (AR) between the lower die (UG) and the upper die (OG);

recording a thermal image of the lower die (UG) and/or the upper die (OG);

determining individual spraying times of the separately controllable nozzles (DU, DO) based on the thermal image;

cool-lubricating places of the die surface of the lower die (UG) and/or the upper die (OG) with the separately controllable nozzles (DU, DO) for the individually determined spraying times;

loading a next workpiece into the forming machine (UM); and storing thermal images over a plurality of cycles of the forming machine (UM);

continuous monitoring operation of the forming machine (UM) over the plurality of cycles based on the stored thermal images; and detecting defects before the lower die (UG) and/or an upper die (OG) is no longer usable.

9. The forming method according to patent claim 8, wherein the individual spraying times are determined based on maximum values of the thermal image in such a manner that a uniform surface temperature of the lower die (UG) and/or upper die (OG) is obtained after cooling lubrication.

10. The forming method according to patent claim 8, wherein cool-lubricating places of the die surface of the lower die (UG) and/or the upper die (OG) with the separately controllable nozzles (DU, DO) for the individually determined spraying times includes cool-lubricating different surface areas of the upper die (OG) by a plurality of upwardly directed nozzles (DO) of the separately controllable nozzles, and cool-lubricating different surface areas of the lower die (UG) by a plurality of downwardly directed nozzles (DU) of the separately controllable nozzles.

* * * * *